United States Patent [19]

Son-Kung

[11] Patent Number: 4,816,203
[45] Date of Patent: Mar. 28, 1989

[54] METHOD OF PRODUCING FIBER REINFORCED PLASTIC BILLIARD CUE

[76] Inventor: Tsai Son-Kung, No. 1, 77 Alley, 71 Lane, 2 Sec, Fu Hsing Rd., Taichung, Taiwan

[21] Appl. No.: 49,958

[22] Filed: May 15, 1987

[51] Int. Cl.$^4$ ............................................. B29C 49/20
[52] U.S. Cl. ..................................... 264/516; 264/314
[58] Field of Search ................... 273/68; 264/506, 523, 264/512, 516, 314

[56] References Cited

U.S. PATENT DOCUMENTS

| | | | |
|---|---|---|---|
| 2,897,840 | 8/1959 | Roberts et al. | 264/506 |
| 3,368,271 | 2/1968 | Scheffler | 273/68 |
| 3,436,079 | 4/1969 | Berry et al. | 273/68 |
| 3,462,147 | 8/1969 | Mancuso | 273/68 |
| 4,231,574 | 11/1980 | Williams | 273/68 |
| 4,587,074 | 5/1986 | De Loof | 264/516 |

FOREIGN PATENT DOCUMENTS 2060411  5/1981  United Kingdom ................. 273/68

Primary Examiner—Jan H. Silbaugh
Assistant Examiner—Neil M. McCarthy
Attorney, Agent, or Firm—Browdy and Neimark

[57] ABSTRACT

A method of producing a fiber reinforced plastic billiard cue which includes a tip end portion and a butted portion by forming an open-ended tubular tube of fiber reinforced plastic; securing joining devices in one open end of the tubular tube; placing the tubular tube in a cavity of a mold corresponding substantially to the size and shape desired of the billiard cue; heating the mold under a predetermined temperature for curing the tubular tube; applying compressed gas through the other open end of the tubular tube to force the shell thereof into contact with the inner surface of the cavity of the mold; and releasing the compressed gas from the open end of the tubular tube.

2 Claims, 2 Drawing Sheets

METHOD OF PRODUCING FIBER REINFORCED PLASTIC BILLIARD CUE

BACKGROUND OF THE INVENTION

This invention relates generally to a method of producing a billiard cue, and in particular, relates to a method of producing a fiber reinforced plastic billiard cue.

Billiard cues are inconveniently long and consequently jointed cues are known and in common use. The jointed billiard cues generally have two portions separately connected by a separable two parts joining device. The method commonly used for producing such jointed cues of fiber reinforced plastic is firstly to mold two tubular bodies and then insert the joining devices into the joining ends of the tubular body by machine.

A disadvantage with this method is that two steps are required: (1) molding the tubular body and (2) inserting the joining devices into the joining ends thereof. Another disadvantage is that the inserting action often causes the wall of the tubular bodies to be split. Moreover with the inserting action by machine there is the disadvantage that the axes of the joining devices and the tubular body cannot be kept in alignment.

SUMMARY OF THE INVENTION

It is an important object of this invention to provide a method of producing fiber reinforced plastic billiard cues which overcomes one or more of the disadvantages enumerated above.

According to this invention, a method of producing a fiber reinforced plastic billiard cue comprises the steps of:

(a) forming an open-ended tubular body comprising outer plys of fiber reinforced plastic;

(b) securing a joining device in the open-end of the tubular body;

(c) placing the tubular body with said joining device in a cavity of a mold corresponding substantially to the size and shape of the desired portion of the billiard cue;

(d) heating the mold under a predetermined temperature for curing the outer plys of the tubular body;

(e) Applying compressed gas through the open end of the tubular body to force the outer plys thereof into contact with the inner surface of the cavity of the mold;

(f) releasing the compressed gas from the open end of the tubular body.

BRIEF DESCRIPTION OF THE DRAWING

To enable this invention to be fully understood; a preferred embodiment will now be described with reference to the following drawings, in which.

DETAILED DESCRIPTION OF THE PREFERRED EMBODIMENT

Figure 1:
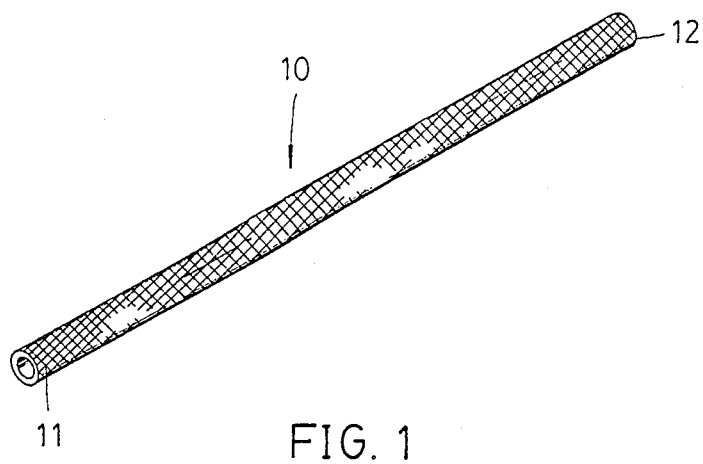
FIG. 1 is perspective view of a tubular tube of fiber reinforced plastic.

Referring now to FIG. 1 there is shown a tubular tube 10 formed from an open-end flexible cellophane tube wrapped with a multi-ply sheet of a resin impregnated fiber.

Figure 2:
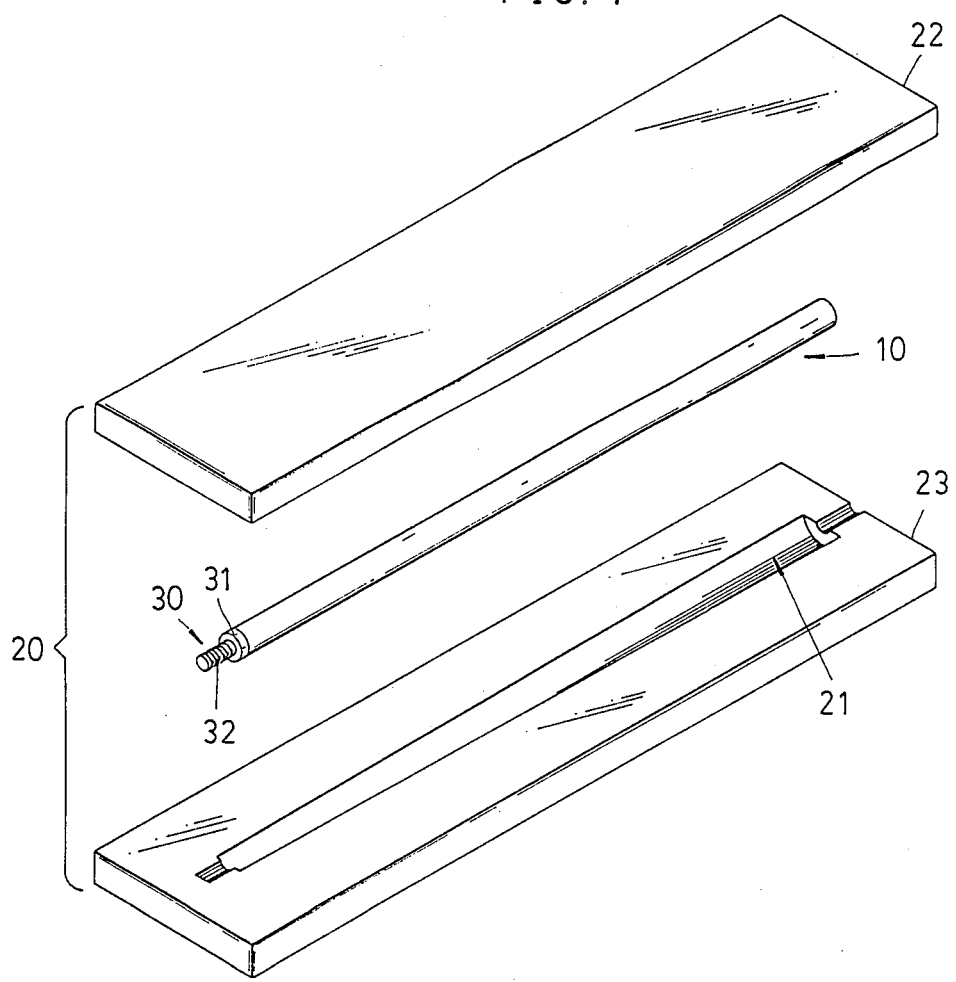
FIG. 2 is an exploded perspective view showing a mold having a cavity corresponding substantially to the size and shape of the butt end portion of the billiard cue and a tubular tube with a stem therein.
Figure 3:
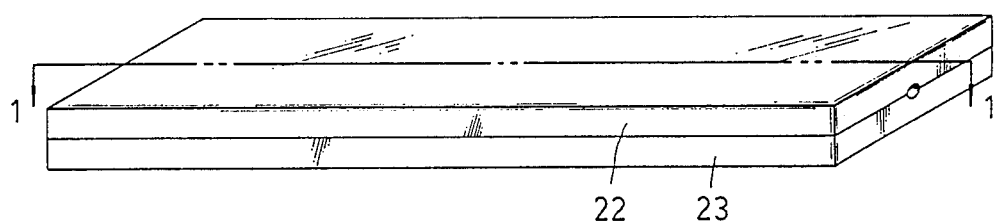
FIG. 3 is a perspective view of a closed mold with a tubular tube therein.
Figure 4:
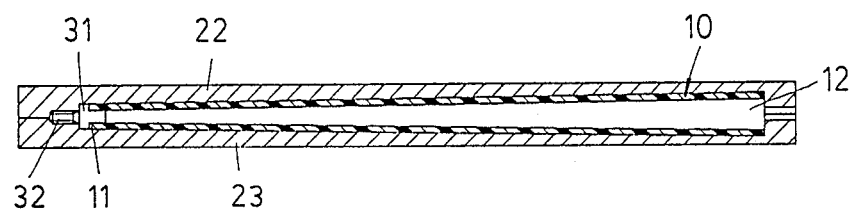
FIG. 4 is an elongated sectional view taken along line 1—1 of FIG. 3.
Figure 5:
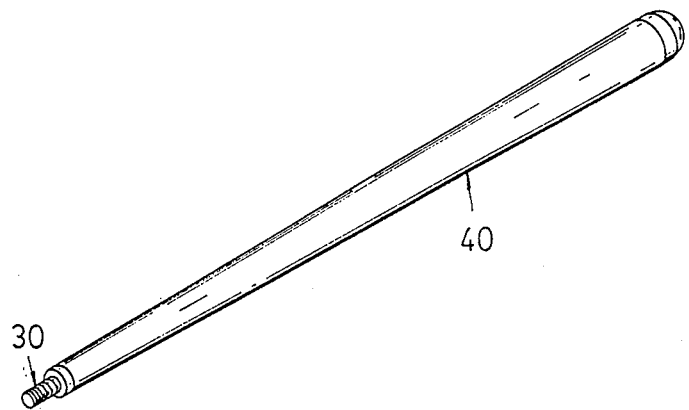
FIG. 5 is a perspective view of a butt end portion of a billiard cue produced by the present invention.

Referring to FIG. 2, FIG. 3 and FIG. 4, a mold 20 includes a cavity 21 formed by male and female portions 22, 23. The cavity 21 corresponds substantially to the size and shape of the butt end portion of a billiard cue. A metal stem 30 has a cylindrical section 31 and a threaded section 32. The cylindrical section 31 of the stem 30 is inserted into the open end 11 of the tubular tube 10. The tubular tube 10 with a metal stem 30 at one end is put in the cavity 21 of the mold 20 and then the mold 20 is closed with a predetermined pressure and heated to a predetermined temperature such as, for example, 140° C. and maintained at that temperature for 20–50 minutes. In the meantime, an adaptor which is attached to the compressed gas is attached to the another open end 12 of the tubular tube 10. The compressed gas will be introduced into the tubular tube 10 so as to force the outer shell of tubular tube 10 to intimately contact with the inner surface of the cavity 21. Thus, the cured outer shell of the resin impregnated fiber takes the shape of the cavity 21. Subsequently, the adapator as well as the compressed gas are removed from the open end 12. Finally the mold 20 is cooled to room temperature and the butt end portion 40 of a billiard cue is finished as shown in FIG. 5.

It is noted that by using the production process of this invention, there is no longer needed two steps to mold the tubular bodies of a billiard cue with the joining devices therein, and the wall of the tubular bodies will not be split by the inserting action. Further the axes of the tubular bodies of a billiard cue and the joining devices therein will be kept in alignment.

I claim:

1. A method of producing a fiber reinforced plastic billiard cue including a tip end portion and a butt end portion comprising the steps of:

forming a cylindrical tube having a shell of fiber reinforced plastic, and a central axis, comprising wrapping a multi-ply sheet of resin impregnated fiber about an open ended flexible tube, said cylindrical tube having first and second open ends;

securing a cylindrical joining stem in said first open end of the cylindrical tube so that said cylindrical stem is coaxial with said central axis;

placing the cylindrical tube in a cavity of a mold corresponding substantially to the size and shape of the desired billiard cue;

heating the mold under a predetermined temperature for curing the cylindrical tube and applying compressed gas through said second open end of the cylindrical tube to force the shell thereof into contact with the cavity of the mold; and releasing the compressed gas from the second open end of the cylindrical tube, and removing cylindrical tube from the mold cavity.

2. A method according to claim 1 wherein said mold cavity has a portion shaped complementary to said joining stem, and said cylindrical tube is placed in said cavity so that said joining stem rests in said portion shaped complementary to said stem.

* * * * *